United States Patent Office 3,087,948
Patented Apr. 30, 1963

3,087,948
RECOVERY OF THORIUM OXALATE FROM SULPHURIC ACID LEACH LIQUOR CONTAINING DISSOLVED THORIUM, RARE EARTHS, AND PHOSPHATE
Gillian Mary Carter, Claygate, David Anthony Everest, Ruislip, and Ronald Alfred Wells, Walton-on-Thames, England, assignors to United Kingdom Atomic Energy Authority, London, England
No Drawing. Filed Aug. 25, 1958, Ser. No. 757,144
Claims priority, application Great Britain Aug. 26, 1957
4 Claims. (Cl. 260—429.1)

This invention relates to the recovery of thorium from the leach liquor obtained by heating a thorium-bearing ore containing rare earths and phosphate (monazite, for example) with excess sulphuric acid, subsequently diluting with water the resulting product in order to dissolve thorium and rare earth sulphates, and separating the solution from undissolved material. The acidity of the leach liquor thus obtained varies with the extent of dilution, but the solution is commonly about 3 N to 3.5 N with respect to sulphuric acid.

Wyroubuff and Verneuil (Comptes Rendus, 1898, 127, page 412) have shown that thorium can be recovered in solid form from monazite leach liquor by a procedure one stage of which entails precipitation of thorium by oxalic acid. In this method the liquor is treated with a very large excess of oxalic acid, enough to bring about total precipitation, so that the precipitate obtained is one containing a very large proportion of rare earths.

The present invention is concerned with an improved method of recovering thorium in solid form from such liquors with the use of oxalic acid as precipitant, which method can be used to obtain in one precipitation stage a thorium concentrate having a relatively low proportion of rare earths and to give an acceptably high degree of thorium recovery from the liquor.

In the method of the invention dissolved thorium is precipitated by means of oxalic acid, with the liquor from 4 N to 6.5 N with respect to sulphuric acid.

The precipitated thorium concentrate thus obtained invariably contains a proportion of phosphate, and is probably a thorium-oxalate-phosphate complex. It will hereafter be referred to in the description as "crude thorium oxalate." It can readily and with relatively little loss be purified from its contained phosphate by simple methods, as by a digestion procedure, and can then be converted by known methods to soluble form suitable for submission to solvent extraction to obtain high purity thorium.

In performing the method of the invention there is used a limited molar proportion of oxalic acid:dissolved thorium, since if too high a proportion is used the crude oxalate precipitate contains an undesirably high proportion of rare earths, while if too low a proportion is used the yield of thorium precipitated is too low. It is difficult to specify generaly the precise molar proportion of oxalic acid:dissolved thorium to be used, because this proportion varies with the concentration of thorium in the leach liquor and with normality of the liquor with respect to sulphuric acid. However, we have found that a molar proportion of oxalic acid:dissolved thorium within the range 3:1 to 5:1 usually gives acceptable results, i.e. a product having a weight ratio thoria:rare earths of at least 0.8:1, obtained in a yield corresponding to at least 85% recovery of thorium from the liquor.

In the practice of the invention the leach liquor is preferably from 4.5 N to 6 N, particularly 4.8 N to 5.5 N, with respect to sulphuric acid.

As already stated, the crude thorium oxalate precipitate obtained by precipitation can be purified by a digestion procedure. This can be performed by bringing the precipitate into contact with aqueous sulphuric acid containing oxalic acid. By digesting the precipitate in this manner practically all the phosphate present therein can be removed, and the ratio thorium/rare earths can be further increased. A small quantity of thorium re-enters solution during digestion, and loss of this re-dissolved thorium can be minimised by using the solution remaining after digestion, whose oxalic acid content is virtually unchanged, as precipitant for the original leach liquor.

How the invention can be performed is illustrated by Examples 1 to 3 following:

*Example 1*

A sample of monazite sand of the following specification:

|  | Percent |
|---|---|
| $ThO_2$ | 7.65 |
| Rare earth oxides | 55.5 |
| $PO_4$ | 35.2 | was ground to a particle size of 0.105 mm. diameter and was heated at 210° C. in the conventional manner with twice its weight of concentrated sulphuric acid for 3½ hours with constant stirring.

The resulting semi-solid paste was allowed to cool and was then carefully diluted with a weight of water equivalent to about four times the original weight of ore taken, the temperature being kept below 30° C. Undissolved material was then filtered off and washed with water to give a final volume of filtrate plus washings of about 7 litres for each original 1 kilogram of ore. This leach liquor had a total acidity of 4.9 N, i.e. the sulphuric acid and the phosphoric acid formed therefrom during the extraction stage together contribute 4.9 grams of acidic hydrogen per litre of the liquor. Since this acidity derives ultimately from the sulphuric acid, the liquor is said to be 4.9 N with respect to sulphuric acid. The acidity can be found by quickly titrating a 10 cc. aliquot of the liquor against standard N aqueous sodium hydroxide solution, with methyl red as indicator. The concentrations of other dissolved materials in the liquor were:

|  | Grams per litre |
|---|---|
| $ThO_2$ | 9.65 |
| Rare earth oxides | 54.85 |
| $PO_4$ | 44.71 |

There was then added to this leach liquor crystalline oxalic acid dihydrate in an amount sufficient to give a concentration of 11.5 grams per litre of the anhydrous acid (equivalent to a mole ratio oxalic acid:thorium of 3.5:1). The liquor was then stirred for 24 hours, and the precipitate of crude thorium oxalate which had formed was filtered off. Analysis showed the precipitate obtained per litre of solution to have a composition equivalent to:

|  | Grams |
|---|---|
| $ThO_2$ | 8.88 |
| Rare earth oxides | 8.09 |
| $PO_4$ | 3.08 | representing a yield of 92% of the thorium present in the original leach liquor.

The weight ratios thoria/rare earth oxides and thoria/$PO_4$ had therefore increased from 0.18:1 to 1.1:1 and from 0.22:1 to 2.88:1 respectively in passing from the leach liquor to the crude thorium oxalate precipitate. The mole ratio of thorium to phosphate in the crude oxalate precipitate is 1:1.

The crude thorium oxalate precipitate was digested at a slurry density of 20 grams thoria per litre with 2 N aqueous sulphuric acid containing 9.5 grams of oxalic acid dihydrate per litre, with stirring for 24 hours. The mole ratio of added oxalic acid:thoria in the precipitate was thus approximately 1:1. The digested material was filtered off and analysed. The following results were obtained for the precipitate obtained from 1 litre of the original leach liquor:

| | Grams |
|---|---|
| $ThO_2$ | 8.78 |
| Rare earth oxides | 2.63 |
| $PO_4$ | 0.087 |

The digested material thus contains very little phosphate and has weight ratios $ThO_2$/rare earth oxides and $ThO_2$/$PO_4$ of 3.3:1 and 101:1 respectively, compared with corresponding ratios of 1.1:1 and 2.88:1 for the crude oxalate and 0.18:1 and 0.22:1 for the leach liquor from which the crude oxalate had been precipitated. The thoria yield from this digestion stage represents 91% of that present in the original leach liquor.

*Example 2*

To a leach liquor obtained following generally the procedure of Example 1, 5.2 N with respect to sulphuric acid and containing:

| | Grams per litre |
|---|---|
| $ThO_2$ | 7.5 |
| Rare earth oxides | 50.0 |
| $PO_4$ | 35.0 | oxalic acid was added in an amount sufficient to give a concentration of 10.8 grams of the anhydrous acid per litre (mole ratio oxalic acid to thorium=4.2:1). The crude oxalate obtained from each 1 litre of liquor had a composition:

| | Grams |
|---|---|
| $ThO_2$ | 6.62 |
| Rare earth oxides | 4.60 |
| $PO_4$ | 2.38 |

This represents a thorium yield of 88.3% from the leach liquor. The weight ratios $ThO_2$/rare earth oxides and $ThO_2$/$PO_4$ are 1.44:1 and 2.78:1 respectively; the mole ratio of thorium to phosphate is 1:1.

*Example 3*

To a leach liquor obtained following generally the procedure of Example 1, 4.9 N with respect to sulphuric acid and containing:

| | Grams per litre |
|---|---|
| $ThO_2$ | 9.65 |
| Rare earth oxides | 54.85 |
| $PO_4$ | 44.71 | there was added oxalic acid in an amount sufficient to give a concentration of 13.1 grams anhydrous acid per litre (mole ratio oxalic acid to thorium=4:1). The precipitation procedure was followed and the crude oxalate obtained from 1 litre of solution was found to have a composition equivalent to:

| | Grams |
|---|---|
| $ThO_2$ | 8.89 |
| Rare earth oxides | 9.87 |
| $PO_4$ | 3.20 |

This represents a thorium yield of 92.1%. The weight ratios $ThO_2$/rare earth oxides and $ThO_2$/$PO_4$ are 0.94:1 and 2.78:1 respectively; the mole ratio of thorium to phosphate is 1:1.

In Examples 4 to 7 following is illustrated the effect of varying the normality of the liquor with respect to sulphuric acid and the molar ratio of oxalic acid:dissolved thorium.

*Example 4*

To a sample of the leach liquor obtained as described in Example 1 (4.9 N with respect to sulphuric acid) oxalic acid was added in an amount sufficient to give a concentration of 8.2 grams per litre of the anhydrous acid (mole ratio oxalic acid/thorium 2.5:1), and the precipitation procedure was repeated. The crude oxalate so obtained from 1 litre of solution had a composition equivalent to:

| | Grams |
|---|---|
| $ThO_2$ | 7.28 |
| Rare earth oxides | 5.28 |
| $PO_4$ | 2.3 |

This represents a yield of only 75.5% of the thorium present in the leach liquor. The weight ratios of $ThO_2$/rare earth oxides and $ThO_2$/$PO_4$ in the crude oxalate are 1.38:1 and 3.17:1 respectively. The mole ratio of thorium to phosphate is equal to 1.1:1.

*Example 5*

To another sample of the leach liquor obtained as described in Example 1 (4.9 N with respect to sulphuric acid) oxalic acid was added in an amount sufficient to give a concentration of 19.7 grams per litre of the anhydrous acid (mole ratio oxalic acid/thorium of 6:1) and the precipitation procedure was repeated. The crude oxalate so obtained from 1 litre of solution had a composition equivalent to:

| | Grams |
|---|---|
| $ThO_2$ | 8.88 |
| Rare earth oxides | 19.20 |
| $PO_4$ | 3.08 |

This represents a yield of 92% of the thorium present in the leach liquor. However, the weight ratio of $ThO_2$/rare earth oxides is only 0.46:1.

*Example 6*

To a leach liquor 7 N with respect to sulphuric acid and having the following concentrations of thoria, rare earths and phosphate:

| | Grams per litre |
|---|---|
| $ThO_2$ | 7.58 |
| Rare earth oxides | 52.11 |
| $PO_4$ | 32.76 | there was added oxalic acid in an amount sufficient to give a concentration of 10.3 grams of anhydrous acid per litre (mole ratio oxalic acid/thorium=4:1). After precipitation as before there was obtained from each litre of solution a crude oxalate having a composition equivalent to:

| | Grams |
|---|---|
| $ThO_2$ | 5.06 |
| Rare earth oxides | 3.64 |
| $PO_4$ | 1.63 |

The product thus has a good weight ratio $ThO_2$/rare earth oxides (1.39:1), but the thorium yield is only 66.8%.

*Example 7*

To a leach liquor 3.5 N with respect to sulphuric acid, and having the following concentrations of dissolved materials:

| | Grams per litre |
|---|---|
| $ThO_2$ | 7.58 |
| Rare earth oxides | 52.11 |
| $PO_4$ | 32.76 | there was added oxalic acid in an amount sufficient to give a concentration of 10.3 grams of anhydrous acid per litre (mole ratio oxalic acid/thorium=4.1). The precipitation procedure was followed as before and the crude oxalate obtained had a composition equivalent to:

| | Grams |
|---|---|
| $ThO_2$ | 6.29 |
| Rare earth oxides | 8.29 |
| $PO_4$ | 2.43 |

This represents a rather low thorium yield (83%) and the weight ratio of $ThO_2$/rare earth oxides is only 0.76:1.

We claim:

1. In the process of recovering a solid thorium concentrate from an aqueous sulphuric acid leach liquor obtained from a thorium and phosphate bearing ore and containing dissolved rare earths and phosphate in addition to thorium, in which process the dissolved thorium is precipitated from the leach liquor by addition of oxalic acid to the solution, the improvement comprising controlling the acid normality with respect to sulphuric acid of the solution between 4 and 6.5 N, and controlling the molar proportion of oxalic acid to dissolved thorium in the leach liquor solution between 3:1 and 5:1, whereby a precipitate containing a high yield of thorium and relatively low ratio of rare earth to thorium is obtained.

2. In the recovery of thorium from a thorium and phosphate bearing ore containing rare earths and phosphate the steps of: heating the ore with excess sulphuric acid; diluting with water the resulting product in order to dissolve thorium and rare earth sulphates; separating from undissolved material the resulting leach liquor containing dissolved thorium, rare earths and phosphate; adjusting the normality of the liquor solution to a range from 4 to 6.5 N with respect to sulphuric acid; adding oxalic acid to the liquor solution and controlling the molar proportion of oxalic acid to thorium in the range between 3:1 and 5:1, to effect preferential precipitation of thorium as crude oxalate.

3. A method according to claim 2, in which the sulphuric acid concentration is adjusted to a concentration in the range from 4.8 N to 5.5 N.

4. A method according to claim 3, in which the oxalic acid is added in amount such that the molar ratio of added oxalic acid to dissolved thorium in the liquor is in range from 3.3:1 to 4.5:1.

References Cited in the file of this patent

UNITED STATES PATENTS 2,849,286    Welt et al. _____ Aug. 26, 1958

FOREIGN PATENTS 580,216    Germany _____ July 7, 1933

OTHER REFERENCES

Rodden et al.: "Anal. Chem. of the Manhattan Project," VIII–1, pp. 160–207 (1950), McGraw-Hill Book Co., N.Y.

Seaborg et al.: "The Actinide Elements," ch. 4 by L. I. Katzin, pp. 66–102 (especially pp. 67 and 89), 1st ed. (1954), McGraw-Hill Book Co., Inc., N.Y.